United States Patent [19]

Brandin

[11] Patent Number: 4,527,239
[45] Date of Patent: Jul. 2, 1985

[54] DIGITAL DATA STORAGE METHODS AND APPARATUS

[76] Inventor: Christopher L. Brandin, 1502 E. Pikes Peak Ave., Colorado Springs, Colo. 80909

[21] Appl. No.: 555,569

[22] Filed: Nov. 28, 1983

[51] Int. Cl.³ .............................................. G06F 9/00
[52] U.S. Cl. .................................................... 364/300
[58] Field of Search ................................ 364/200, 900

[56] References Cited

U.S. PATENT DOCUMENTS 4,084,224  4/1978  Appell et al. ...................... 364/200
4,316,245  2/1982  Luu et al. ........................... 364/200
4,395,757  7/1983  Blendenu et al. .................. 364/200

Primary Examiner—Raulfe B. Zache
Assistant Examiner—John G. Mills
Attorney, Agent, or Firm—Schapp and Hatch

[57] ABSTRACT

Digital data storage methods and apparatus in which the addresses or records stored in a storage memory are themselves stored in corresponding entries in a catalog memory, each entry in the catalog memory also includes a confirmer derived from a key extracted from the corresponding record in the storage memory, and a limited number of the entries in the catalog memory are enchained with chainhead entries.

15 Claims, 12 Drawing Figures

CONTROL DEVICE REGISTERS

| NEW RECORD ADDRESS (NRA) |
| QUERIED ENTRY ADDRESS (QEA) |

- NEW RECORD ADDRESS (NRA)
- CHAIN ADDRESS (CHA)
- CONFIRMER (CNF)
- QUERIED ENTRY CONFIRMER (QEC)
- QUERIED ENTRY POINTER (QEP)
- QUERIED ENTRY ADDRESS (QEA)
- PREVIOUS CHAIN POINTER (PCP)
- DUPLICATE COUNTER (DC)
- FREE CHAIN POINTER (FCP)

FIG. 6.

CATALOG ENTRY FORMAT

- RECORD ADDRESS (A)
- CONFIRMER (C)
- CHAIN POINTER (P)

FIG. 5.

| BIT NO. | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| BIT NO. | 24 | 25 | 26 | 27 | 28 | 29 | 30 | 31 | 0* | 17 | 18 | 19 | 20 | 21 | 22 | 23 |
| BIT NO. | 17 | 18 | 19 | 20 | 21 | 22 | 23 | 24 | 25 | 26 | 27 | 28 | 29 | 30 | 31 | 32 |
| SUM NO. | 1 | 2 | 3 | 4 | 5 | 6 | 7 | 8 | 9 | 10 | 11 | 12 | 13 | 14 | 15 | 16 |

* LOGICAL ZERO ; NOT A BIT NO.

DIGITAL DATA STORAGE METHODS AND APPARATUS

BACKGROUND OF THE INVENTION

1. Field of the Invention

My present invention relates to digital data storage methods and apparatus, and more particularly to associative digital data storage methods and apparatus.

2. Description of the Prior Art (The term "prior art" as used herein or in any statement made by or on behalf of applicant means only that any document or thing referred to as prior art bears, directly or inferentially, a date which is earlier than the effective filing date hereof.)

Associative digital data storage methods and apparatus are old and well-known in the prior art. For example, such methods and apparatus are described in the well-known text entitled *Computer Data-Base Organization*, Second Edition, by James Martin, which was published by Prentice-Hall, Inc., of Englewood Cliffs, N.J., U.S.A., in 1977 (which text will hereinafter be referred to as "Martin"), and particularly in Chapter 36 thereof.

Prior art associative digital data storage apparatus of medium to large storage capacity have in general, however, proven to be either impractically slow, too expensive, or both.

SUMMARY OF THE INVENTION

Accordingly, it is an object of my present invention to provide high performance, medium to large scale associative digital data storage methods and apparatus capable of extremely high speeds of operation.

It is another object of my present invention to provide associative digital data storage apparatus which are inexpensive and compact as compared with prior art associative digital data storage apparatus.

It is yet another object of my present invention to provide digital data storage device control apparatus which make possible extremely high speed operation of digital data storage devices, and at the same time are so compact that they can be readily incorporated into digital data storage devices, such as disk files.

It is a further object of my present invention to provide associative digital data storage methods and apparatus adapted for use in the memory units of graphic data systems, pattern recognition systems, and the like, whereby to increase the speeds of the operation of such systems to hitherto unachieveable levels.

It is another object of my present invention to provide digital computer systems in which association between attributes of entities is carried out without recourse to the central processing unit of the system.

My present invention, accordingly, comprises the several steps and the relation of one or more of such steps with respect to each of the others, and the apparatus embodying features of construction, combinations of elements, and arrangements of parts which are adapted to effect such steps, all as exemplified in the following disclosure, and the scope of my present invention will be indicated in the Claims appended hereto.

In accordance with a principal feature of my present invention, at least some associative digital data storage systems thereof comprise a conventional data store containing a plurality of data records and a catalog memory containing a corresponding plurality of entries, each entry representing at least the address in said store of a corresponding one of said data records and a segment of a transform of a key derived from or related to said corresponding one of said data records, which segment is sometimes called a confirmer herein.

In accordance with a further principal feature of my present invention pluralities of said entries include chain pointer addresses by means of which they are chained together in the well-known manner.

In accordance with another principal feature of my present invention at least some of the associative digital data storage systems thereof comprise input means adapted to receive record data to be stored, queries regarding record data which are or might be stored therein, and/or keys associated with particular records which are or might be stored therein.

In accordance with an additional principal feature of my present invention at least some of the associative digital data storage systems thereof further comprise analyzer means for analyzing record data and/or queries received by said input means to derive keys therefrom.

In accordance with another principal feature of my present invention associative digital data storage means thereof comprise transformer means for operating upon said keys in accordance with pre-determined key transform algorithms to produce corresponding key transforms therefrom.

In accordance with another principal feature of my present invention associative digital data storage means thereof comprise dissector means for dissecting said key transforms into plural segments.

In accordance with yet another principal feature of my present invention at least some associative digital data storage systems thereof further comprise combiner means for combining pre-determined key transform segments of each set of segments provided by said dissector means in accordance with certain pre-determined logical functions.

In accordance with a further principal feature of my present invention, the logical combinations of key transform segments produced by said combiner means, or key segment combinations, are utilized as the addresses of chainhead catalog entries, i.e., catalog entries which are the initial entries of chains of such entries.

In accordance with another principal feature of my present invention, associative digital data storage systems thereof further comprise verifier means for comparing a key derived from a record read from the store with a key derived from the query which evoked the reading of that record from the store.

In accordance with another feature of my present invention, the verifiers of certain embodiments thereof comprise non-verification signal producing means for producing signals indicating that the corresponding key derived from the query does not coincide with the key derived from the record read from the store in response to that query.

In accordance with yet another principal feature of my present invention, some of the functions (e.g., query analysis, key transformation, key transform dissection, key transform segment combination) of certain embodiments thereof are carried out by a general purpose digital computer or processor which is programmed to carry out those functions, while other functions of the same embodiment are carried out by means of dedicated circuits adapted only for carrying out those other functions or particular ones of them.

In accordance with an additional principal feature of my present invention, the catalog memories of certain embodiments thereof are random access memories (RAM's).

In accordance with another principal feature of my present invention, the catalog memories of certain embodiments thereof are PROM's, ROM's, or EEPROM's.

For a fuller understanding of the nature and objects of my present invention reference should be had to the following detailed description, taken in connection with the accompanying drawings.

BRIEF DESCRIPTION OF THE DRAWINGS

FIG. 5 schematically represents the format of a catalog memory entry in a data storage system embodying aspects of my invention;

FIG. 6 schematically represents the registers of the control device of a data storage system embodying aspects of my invention;

DESCRIPTION OF THE PREFERRED EMBODIMENTS

Figure 1:
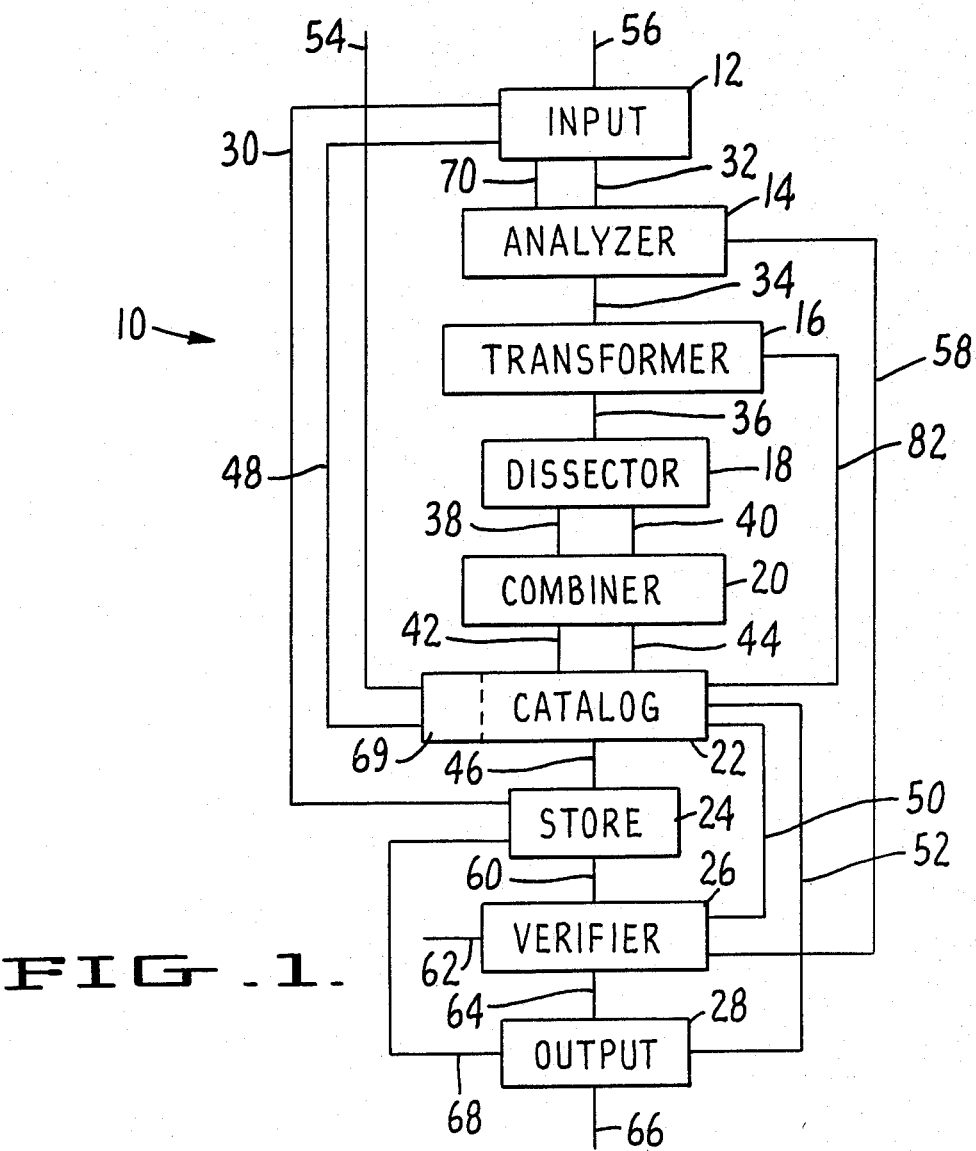
FIG. 1 is a functional block diagram of a data storage system embodying aspects of my invention.

Referring now to FIG. 1, there is shown a schematic diagram of a digital data storage system 10 embodying my present invention.

As seen in FIG. 1, data storage system 10 comprises an input section 12, an input analyzer section or analyzer section 14, a key transformer section or transformer section 16, a key transform dissector section or dissector section 18, a key transform segment combiner section or combiner section 20, a catalog memory section or catalog section 22, a digital data storage section or store section 24, a verifier section 26, and an output section 28.

It is to be particularly understood that not all embodiments of my present invention will comprise all of the sections 12 through 28 schematically represented in FIG. 1.

For example, it is anticipated that certain embodiments of my invention incorporated in pattern recognition devices will not include input sections or analyzer sections, because the pattern analysis sections of the host pattern recognition devices will themselves provide binary signals which can be directly utilized in the transformer sections of those embodiments of my invention.

It is further anticipated that in other embodiments of my invention incorporated in pattern recognition devices the statistical properties of the signals provided by the pattern analysis sections of the host pattern recognition devices will be such that the embodiments of my invention utilized therein may dispense with transformer sections as well.

It is further anticipated that other embodiments of my invention adapted for use in particular host devices will dispense with other sections schematically represented in FIG. 1, e.g., the verifier section.

In addition, it is anticipated that certain embodiments of my invention will be made and sold as digital data storage device controllers which are adapted to be interconnected with and to control the operation of existing digital data storage devices of known type such as those sometimes called "disk drives" in the digital data storage art. Such controller embodiments of my invention will, of course, not themselves include any equivalent to store section 24 shown in FIG. 1.

It is further anticipated that some embodiments of my invention, sometimes called "software versions", will consist substantially completely of (1) a programmable general purpose digital computer unit, e.g., an integrated circuit microprocessor, (2) a random access memory unit which serves as the data storage facility of the catalog section, and (3) a conventional digital data storage unit, e.g., a disk drive, which functions as the store section. In such embodiments of my invention the input section 12, the analyzer section 14, the transformer section 16, the dissector section 18, the combiner section 20, part of catalog section 22, the verifier section 26, and the output section 28 will not have separate physical existence as independent devices; rather, the functions of those sections will be carried out by the general purpose digital computer unit or processor under the control of a suitable program the provision of which is within the scope of those having ordinary skill in the art, informed by the present disclosure.

It is particularly anticipated, and is a characteristic feature of my invention, that in certain embodiments thereof called "hybrid versions" the functions of some of the sections represented in FIG. 1 will be carried out by a suitably programmed general purpose digital computer unit or processor unit, i.e., will be "software-implemented", whereas the functions of other ones of the sections represented in FIG. 1 will be carried out by physically separate circuits specifically designed and dedicated to carry out those other functions, or particular ones of them, i.e., will be "hardware-implemented".

In a hybrid embodiment of my invention which is a principal feature thereof the functions of the analyzer, dissector, and combiner sections represented in FIG. 1 will be carried out by a suitably programmed general purpose digital computer unit or processor, as will certain other functions of that embodiment, but the function of the transformer of that embodiment will be carried out by a physically separate circuit specially designed and dedicated to carry out the key transform function.

In other hybrid embodiments of my invention, designed by those having ordinary skill in the art, informed by the present disclosure, desired combinations of operating speed and economy will be achieved by software-implementing particular groups of functions and hardware-implementing the rest.

Referring again to the comprehensive schematic representation of many embodiments of my present invention shown in FIG. 1, which embraces but is not limited to digital data storage system 10, the functions of the separately designated sections thereof will now be described.

The function of input section 12 is to receive and temporarily retain records to be inserted into store 24 and queries or keys for invoking the reading of corresponding records from store 24, and to pass records to be inserted into store 24 to store 24, as schematically illustrated by information flow path indicating line 30 in FIG. 1.

The records, queries, or keys received by input section 12 take the form of bit patterns which may conveniently be thought of as binary numbers but which may represent alphanumeric data in accordance with an established code, such as the American Standard Code for Information Interchange (ASCII).

The term "query" as used herein denotes an input bit pattern or bit signal set applied to the input of a device embodying my invention to invoke the reading of a particular record. In some embodiments the queries may be the records themselves or the keys thereto.

The data storage systems of most embodiments of my invention will be utilized in connection with computers, e.g., general purpose digital computers or the dedicated computer sections of pattern recognition devices, and thus the input signals to the input sections thereof will take the form of electrical bit signal patterns in bit-parallel, pattern-serial form.

As indicated by information flow path line 32 in FIG. 1, input section 12 also supplies the records, queries, or keys which it receives to analyzer 14. (It is to be understood that none of the information flow path lines shown in the present drawings necessarily represents a single conductor. To the contrary, information flow path lines 30 and 32 as applied to most embodiments of my invention represent buses, i.e., pluralities of conductors each of which carries an electrical signal which represents, seriatim, the successive bits in the same bit position of successive bit patterns.)

The function of analyzer 14 is to extract from successively presented bit pattern signal sets on information flow path 32 the parts thereof, or the parts of particular ones thereof, which are used or are to be used as keys to identify records or groups of records stored in store 24.

It is to be noted that my invention is by no means limited to embodiments in which the records or record groups stored in store 24 are limited in length, i.e., number of bits per record or record group, to the length of the bit patterns successively carried by information flow path 32. To the contrary, it is anticipated that in many embodiments of my present invention the records or record groups stored in store 24 will represent many such bit patterns, and the provision of circuit arrangements and programming for data processors, and the corresponding bit pattern codings, for thus handling groups of such bit patterns will be provided by those having ordinary skill in the art without the exercise of invention or undue experimentation.

For clarity of discussion, each bit pattern or set of bit signals received by input section 12 from the associated computer or other host device, and any corresponding set of bit representing characters, will be called an input word or word herein. The number of bits or bit signals in each such word will be called the input word length herein. In many embodiments of my invention, then, the records or record groups stored in the store will comprise several or many input words or parts thereof.

Further, it is contemplated as a feature of my present invention that the input word length in many embodiments thereof will not be limited to one or a few bytes, but rather may in some embodiments be a considerable number of bytes.

It is also contemplated that the lengths of the record-identifying keys employed in particular embodiments of my invention will range from several bytes to a full input word length.

Further, it is to be noted that the length of the input word in any particular embodiment of my invention is not necessarily equal to the length of the words successively transmitted to the analyzer section from the input section.

The function of transformer 16 of FIG. 1 is to operate upon the keys successively supplied to it via information flow path 34 in accordance with a predetermined key transformation algorithm, and thus to produce on information flow path 36 corresponding key transforms.

Many transformation algorithms suitable for use in embodiments of my invention, particularly when concatenated to produce certain key transformation characteristics which are features of my invention, are known in the data processing art. A number of such transformation algorithms are discussed at pages 383 through 385 of Martin. In accordance with my invention, however, such transformation algorithms and concatenations thereof are selected for reasons different from those which govern the selection of hashing transformation algorithms.

As discussed in Chapter 21 of Martin and at pages 343 and 344 thereof, and in many other places in the computer literature, hashing transformation algorithms are so selected that the key sets which they operate upon are converted into corresponding spreads of numbers or key transforms, each of which number or key transform spreads is of the order of magnitude of the available range of addresses in the store.

As also discussed in Martin, it is desirable that these spreads of key transforms (sometimes called "relative bucket addresses") be distributed as uniformly as possible across the available address space, i.e., between the buckets available in the store. It is further observed in Martin, however, that " . . . Realistic transforms distribute the keys very imperfectly . . . ".

In devising a key transformation algorithm for use in data storage systems embodying my present invention it is not necessary, as it is in devising a hashing transformation algorithm, to seek an algorithm which will convert an arbitrarily distributed set of numbers (a record key set) into a uniformly distributed set of numbers (key transforms) which are proportional to a corresponding set of available bucket address numbers.

Rather, the key transformation algorithm of a particular embodiment of my present invention will be devised to satisfy to a greater or less degree a corresponding particular plurality of the following criteria, which particular plurality of criteria is selected in accordance with the requirements of the host device or system.

Compression

It will be found desirable in many embodiments of my present invention to provide key transformation algorithms which reduce a key of considerable length, e.g., between 8 and 256 or more bytes, to a much shorter key transform, e.g., 32 bits.

Speed

Figure 2:
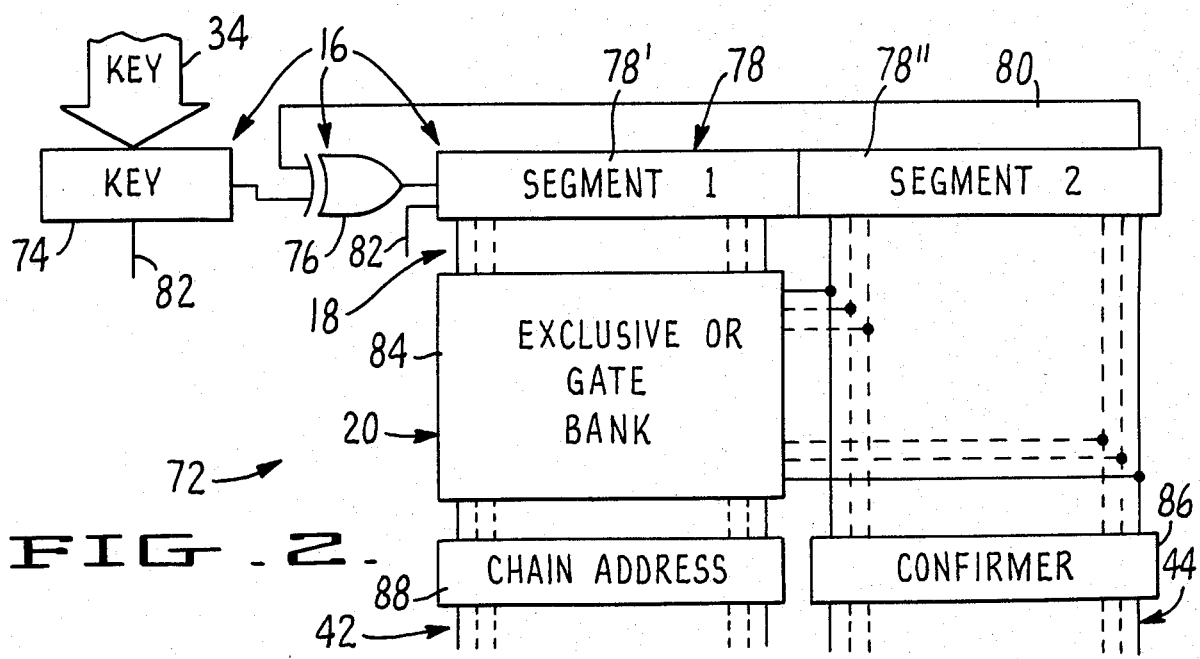
FIG. 2 is a schematic block diagram of an entry index generator circuit embodying aspects of my invention.

It is particularly desirable in nearly all embodiments of my present invention to provide key transformation algorithms which are either very simple mathematically and thus can be executed very rapidly by suitably programmed microprocessor apparatus or the like, e.g., the "division method" taught in Martin at page 383, or are executable by simple highspeed dedicated circuits especially adapted therefor, or both. An example of such a simple high-speed dedicated circuit for executing a key transformation algorithm is shown in FIG. 2.

Limited Key Transform Duplication

It is also desirable in nearly all embodiments of my present invention to employ key transformation algorithms which produce the same key transform from different keys in only a few cases. It is to be noted, however, that it is not necessary in data storage devices and systems embodying my invention that key transform duplication be as rigidly suppressed as in some of the prior art storage devices and systems which employ address hashing techniques.

Invertibility

It is also desirable that the key transformation algorithms of certain embodiments of my present invention be characterized by a suitable degree of invertibility, i.e., that operating upon the key transform set resulting from the application of a particular key transform algorithm to a particular key set with that same key transformation algorithm will produce the original key transform set. In other words, as stated by Martin, it is desirable that the conversion of the key set to the key transform set should be done without losing any of the information contained in the key set (Martin, page 382).

Associativity

It is also desirable that the key transformation algorithms of certain embodiments of my invention be so selected as to aid in determining associative relationships between records contained in devices embodying my invention.

The function of dissector 18 is to dissect each key transform representing signal set appearing on information flow path 36 into a plurality of separate signal sets or segments, and to present those signal sets or segments to combiner 20 via information flow paths 38 and 40.

It is to be understood that while FIG. 1 shows a dissector 18 which produces two signal sets or segments, the scope of my present invention is not limited to devices in which the key transform is dissected into two parts. Further, my invention is not limited in scope to devices in which every signal appearing on a conductor of information flow path 36 is represented by a signal on one of the conductors which make up flow paths 38 and 40.

Each signal set or key transform segment representation appearing on information flow path 38 will arbitrarily be called signal set 1 or segment 1 herein; and correspondingly each signal set or key transform segment representation appearing on information flow path 40 will arbitrarily be called signal set 2 or segment 2 herein. It is to be understood, however, that no implication as to the nature of the respective signal sets or segments is to be inferred from these arbitrarily assigned index numbers, 1 and 2. It is not to be inferred, for example, that segment 1 corresponds to the more significant bit positions of a register or a latch which is a part of transformer 16 or analyzer 14, nor that segment 2 corresponds to the less significant bit positions of such a register or latch. Rather, the correspondence between the signals of signal set 1 and the corresponding signals carried by the conductors of information flow path 36 will be determined by those having ordinary skill in the art, informed by the present disclosure, in accordance with such factors as the nature of the transformation algorithms executed by transformer 16 and the nature and purpose of the host device.

Combiner 20 operates upon the signal sets or key transform segments appearing on information flow paths 38 and 40 and produces related signal sets on information flow paths 42 and 44. The signal sets appearing on information flow path 42 will be called chainhead entry addresses or chain addresses herein, and the signal sets appearing on information flow path 44 will be called confirmation indices or confirmers herein. In general, it is to be preferred that the values of the chainhead addresses in particular embodiments of my invention vary with the values of their associated keys, while the values of the corresponding confirmers do not necessarily do so.

A particular combiner structure which constitutes a feature of my invention is illustrated in FIG. 2. It is to be noted, however, that my invention is not limited in its scope to devices comprising the particular combiner structure illustrated in FIG. 2.

As will be evident to those having ordinary skill in the art from FIG. 2, the combiner portion thereof serves to combine corresponding ones of the signals making up signal set 1 and signal set 2 in accordance with the well-known EXCLUSIVE OR logic function and to store the individual logical results in corresponding bit storage elements of a latch or register called the chain address latch or chain address register; and to store the respective signals of the segment 2 signal set in corresponding bit storage elements of a latch or register called the confirmer latch or confirmer register.

It will be here assumed, for the purpose of illustration only and not by way of limitation of the scope of my invention, that combiner 20 of FIG. 1 corresponds in structure and function to the combiner portion of FIG. 2 just described; that information flow path 42 carries a signal set representing the signals stored in the respective bit storage elements of the just described chain address latch; and that information flow path 44 carries a signal set representing the signals stored in the respective bit storage elements of the just-described confirmer latch; i.e., that combiner 20 operates upon the successive sets of segment 1 and segment 2 signals appearing on information flow paths 38 and 40, respectively, in accordance with the mode of operation of the combiner of FIG. 2 just described, and produces on information flow paths 42 and 44 signal sets corresponding to the contents of the chain address latch and the confirmer latch, respectively.

Catalog 22 of FIG. 1 is a high-speed random access memory the storage area of which is, by suitable programming of its control device, logically divided into a plurality of entry locations, the content of each of which is called an entry herein.

Each such entry location of catalog 22 is adapted to contain: a record address (A), which is the address of a record location in store 24; a confirmer (C), hereinafter explained; and a chain pointer address or chain pointer (P) of the kind well-known and described in many sources, e.g., Martin.

Store 24, in the embodiment of my invention now being described in connection with FIG. 1, is a disk drive, which by its nature is characterized by much longer average access time than random access catalog memory 22.

In many embodiments of my invention the catalog memory will be a random access memory, and the store will be a serial access memory device characterized by much longer average access time than that of the random access catalog memory. It is to be noted, however, that my invention is not so limited. For example, the catalogs of some embodiments of my invention may be PROM's, ROM's, or EEPROM's, and other embodiments of my invention will not be provided with stores at all.

The control device of catalog 22 also serves to control the operation of store 24, input section 12, verifier 26 and output section 28 by means of signals carried by information flow paths 46, 48, 50, and 52, respectively.

Verifier 26 serves, after the reading of a record from store 24 in response to a read signal on information flow path 54 and a query on information input flow path 56, to compare a key extracted from the record just read with a key extracted from the input query. For this purpose, verifier 26 comprises a comparator and an analyzer constructed and arranged to carry out substantially the same function as analyzer 14, all under the control of control signals received from the control device of catalog 22 via information flow path 50. Verifier 26 further comprises a latch in which is maintained a representation of each key derived by analyzer 14 from a signal set on information flow path 32, which latch provides one of the inputs to the said comparator; the analyzer which is a part of verifier 26 providing the other. Each such representation of a key derived by analyzer 14 is supplied to verifier 26 via information flow path 58 (FIG. 1). The records successively read from store 24 are supplied to verifier 26 via information flow path 60.

Verifier 26 produces verification or non-verification signals on information flow path 62 in accordance with whether the key supplied by analyzer 14 does or does not match the key derived from the record just read by the internal analyzer of verifier 26. The utililzation of these signals from verifier 26 is determined in accordance with the nature and requirements of the host device.

My invention is not limited to key verifier embodiments in which the verifier compares a key derived from the record just read with a key independently derived from the query which elicited that reading. Rather, my invention also embraces devices in which the verifier is a record verifier, i.e., a verifier which compares the complete record just read from the store with the record submitted to the input section to evoke that reading.

Further, verifiers will in general be used only in embodiments of my invention in which empirical verification is required.

In the embodiment shown in FIG. 1 each verification signal supplied to output section 28 via information flow path 64 enables output section 28 to emit on output information flow path 66 a representation of the just read record which was supplied to it via information flow path 68.

Before considering particular embodiments of my present invention, the general operating modes thereof will be described with reference to FIG. 1.

Writing

In order to store a new record supplied by the host device in store 24 an electronic representation of that record must be supplied by the host device to input section 12 via input information flow path 56, and a write signal must at the same time be impressed upon information flow path 54 by the host device.

The presence of the write signal on information flow path 54 causes the internal control device of catalog 22 to (a) signal store 24 (via information flow path 46) to be prepared to receive a new record via information flow path 30 and (b) command signal input section 12 (via information flow path 48) to transmit the new record to be written to store 24 via information flow path 30.

The control system of store 24, in the well-known manner, causes the new record received over the information flow path 30 to be written in the next available storage location of store 24, and then notifies the internal control device of catalog 22 (via information flow path 46) of the address of the storage location in which this new record was written. (This information, i.e., the address in the store of the newly written record, is stored in the new record address (NRA) register of the control device 69 of catalog 22).

Analyzer 14, under the control of enabling signals supplied by catalog control device 69 (via information flow path 48, input section 12, and information flow path 70) extracts the key from the new input record representation received via information flow path 32.

Analyzer 14 may, for example, be a latch which is so connected to input section 12 as to store only a part of the new record, which part of the new record is the key thereto.

Transformer 16 then receives the key from analyzer 14 (via information flow path 34) and operates upon it in the manner illustrated in FIG. 2 to produce the corresponding key transform on information flow path 36.

Referring now to FIG. 2, there is schematically shown a circuit which combines a transformer, a dissector, and a combiner. Such a circuit will be called an entry index generator herein, and the circuit of FIG. 2 will be called entry index generator 72 herein.

The term "entry index" as used herein denotes both a chain address and a confirmer, as those terms are defined herein, taken individually, and also denotes a simultaneously generated pair of the same, taken collectively. It is to be noted that the scope of my invention is not limited to devices in which the entry index generator comprises separate transformer, dissector, and combiner circuits as schematically illustrated, e.g., in FIG. 1, but also embraces devices in which the entry index generator is not divided into readily individually identifiable transformer, dissector, and combiner circuits, e.g., a microprocessor suitably programmed to carry out the functions of these three circuits, inter alia.

As seen in FIG. 2, transformer 16 comprises a shift register 74, into which the entire key is emitted in parallel by analyzer 14 via information flow path or bus 34; an EXCLUSIVE OR gate 76; and a single shift register 78, which is conceived of as divided into a part 78' containing segment 1 and a part 78" containing segment 2.

Shift register 78 is comprised of 32 stages or bit storage elements, and is provided with a feedback connection 80 extending from its 31st bit storage element to one of the input terminals of EXCLUSIVE OR gate 76.

(In the transformers of some other embodiments of my invention a different gating arrangement will be substituted for EXCLUSIVE OR gate 76, and/or one or more feedback connections will be brought from other bit storage elements of the segment-containing shift register or segment register to said different gating arrangement.)

Under the control of a suitable series of signals provided by catalog control unit 69 via information flow path 82, the key is shifted from key register 74 into segment register 78, one bit at a time, through a predetermined number of single bit shift operations, whereafter the key transform corresponding to the key produced by analyzer 14 is in segment register 78; the comparative width of shift registers 74 and 78 and the number of bit shifting operations being predetermined in accordance with the selected key transformation algorithm.

As further seen in FIG. 2, the function of dissector 18 is fulfilled by the predetermined selection of the output leads of segment register 78 (designated as segment 1 or subregister 78' leads) which are connected to the EXCLUSIVE OR gate bank 84, and the predetermined selection of the output leads (designated as segment 2 leads or sub-register 78'' leads) which are connected directly to corresponding input terminals of the confirmer latch 86.

EXCLUSIVE OR gate bank 84 consists of a set of independent single output EXCLUSIVE OR gates of well-known type each of which has one input terminal connected to an associated output terminal of sub-register 78' and another input terminal connected to a corresponding output terminal of sub-register 78''. The output terminal of each one of these independent EXCLUSIVE OR gates is connected, respectively, to an associated one of the bit element storage unit input terminals or stage input terminals of chain address register 88.

Thus, it may be said, in the common parlance of the computer engineering art, that the segment 1 outputs of shift register 78 are "EXCLUSIVE-ORed" with the corresponding segment 2 outputs of shift register 78, and the logical results stored in corresponding bit storage elements of chain address latch 88.

As also seen in FIG. 2, the bit storage element output connections of chain address latch 88 and confirmer latch 86 correspond, respectively, with the information flow paths 42 and 44 of FIG. 1.

Referring again to FIG. 1, and further considering the new record writing operation, it will be seen that catalog 22 receives the entry indices, i.e., the chain address and the confirmer, corresponding to the new record stored in store 24 via information flow paths 42 and 44 respectively.

Figures 3, 4A, 4B, 4C:
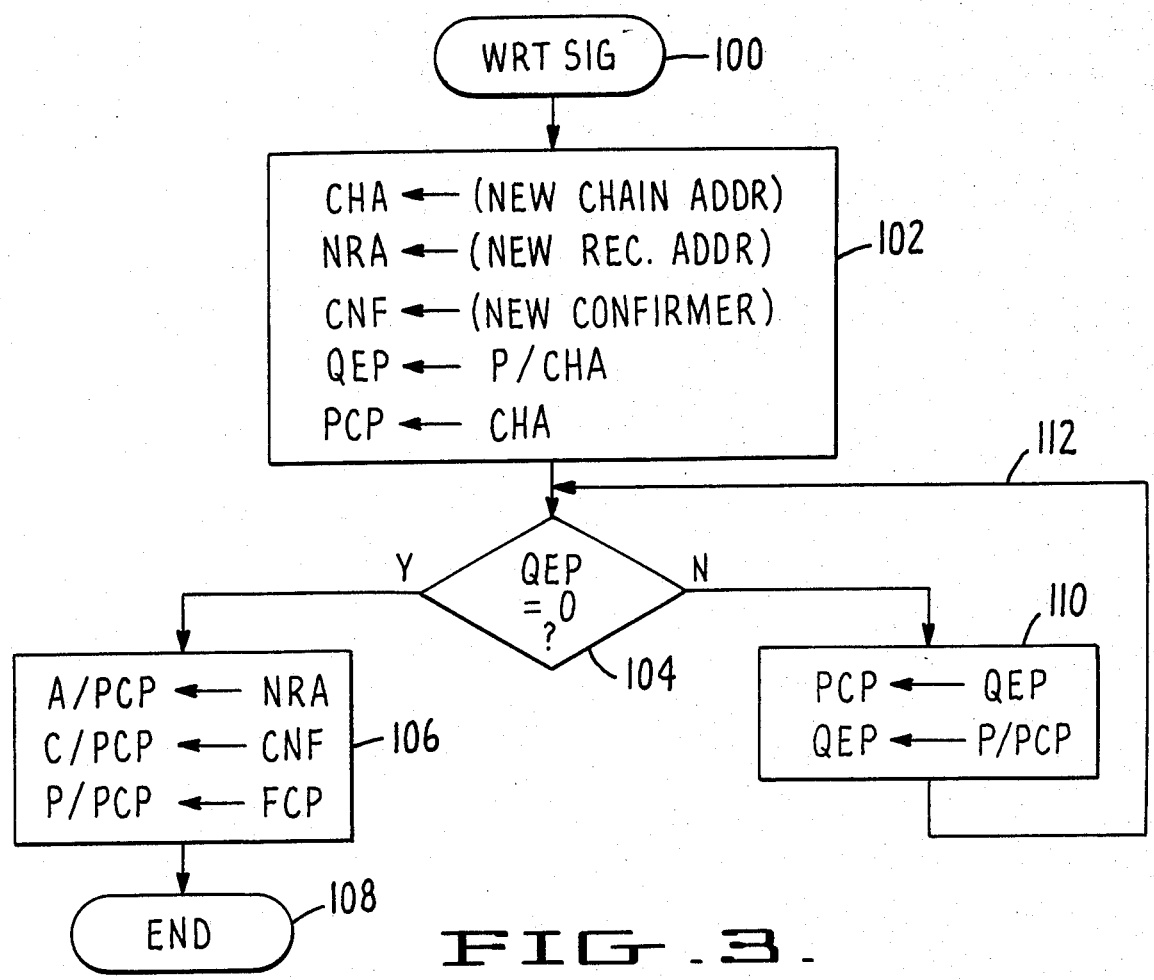
FIG. 3 is a flow chart of the record writing operation carried out in a data storage system embodying aspects of my invention.
FIGS. 4A, 4B, and 4C schematically represent, respectively, a blank entry, a three entry chain, and a single entry chain in the catalog memory of a data storage system embodying aspects of my invention.

At this stage of the new record writing operation, as shown in FIG. 3, suitable correspondingly named registers in the control device of catalog 22 contain: (a) the new record address (NRA register), (b) the new chain address (CHA register), and (c) the new confirmer (CNF register), each expressed as a binary number.

The catalog control device 69, which may for example be an integrated circuit microprocessor of well-known type programmed by one having ordinary skill in the art who is informed by the present disclosure, then reads the chain pointer (P) part of the catalog entry addressed by the content of the CHA register (P/CHA) into an internal register called the queried entry pointer (QEP) register, and duplicates the content of the CHA register (CHA) in an internal register called the previous chain pointer (PCP) register.

Following the program steps discussed above, which are graphically illustrated in the flow chart of FIG. 3, step 102, control device 69 carries out step 104, in which the content of the QEP register is tested for zero value in the well known manner.

If there is no entry at the catalog location addressed by the content of the CHA register (FIG. 4A) and thus P/CHA, the content of the QEP register, is logical zero (Z), the routine shown in FIG. 3 branches to step 106, in which the content of the NRA register is copied into the A part of catalog entry location addressed by the content of the PCP register (A/PCP), the content of the CNF register is copied into the C part of the catalog entry location addressed by the content of the PCP register (P/PCP), and the next available catalog entry location address, taken from an internal free chain pointer (FCP) register (FIG. 5), the successive contents of which are provided by a suitable sub-program or routine in the well known manner, is copied into the P part of the PCP register (P/PCP). The routine of FIG. 3 then terminates at step 108, with the proper catalog entry corresponding to the new record (now in store 24) at the proper location in catalog 22, all in accordance with the principles of my invention.

If, on the other hand there are, say, three entries already in the entry chain in catalog 22, whose first or chainhead entry is addressed by the content of the CHA register (FIG. 4B), and thus P/CHA, the P part of the catalog entry addressed by the content of the CHA register is non-zero (NZ), the routine shown in FIG. 3 branches at decision step 104 to step 110, in which the content of the QEP register is transferred to the PCP register, and the P part of the catalog entry location addressed by the content of the PCP register (P/PCP) is copied into the QEP register. The routine then returns by path 112 to step 104, and, the content of the QEP register being non-zero (E3, in fact), the routine then branches again to step 110, and thence to decision step 104. Since at this time the content of the QEP register is zero (Z), the routine branches to step 106, in which the proper catalog entry corresponding to the new record is made at the proper entry location in catalog 22, as explained above.

The format of a catalog entry is schematically represented in FIG. 5, and the registers of control device 69 are schematically represented in FIG. 6. As seen in FIG. 6, control device 69 further comprises a duplicate counter (DC) register.

Reading

Assuming that a large number of records have been written in store 24 by the host device in accordance with the method of writing just described, which is a principal feature of my present invention, and that each such record in store 24 is catalogued by means of a corresponding entry in catalog 22 of the general type shown in FIG. 5, the record reading operation which is also a principal feature of my present invention will now be described.

Figure 7:
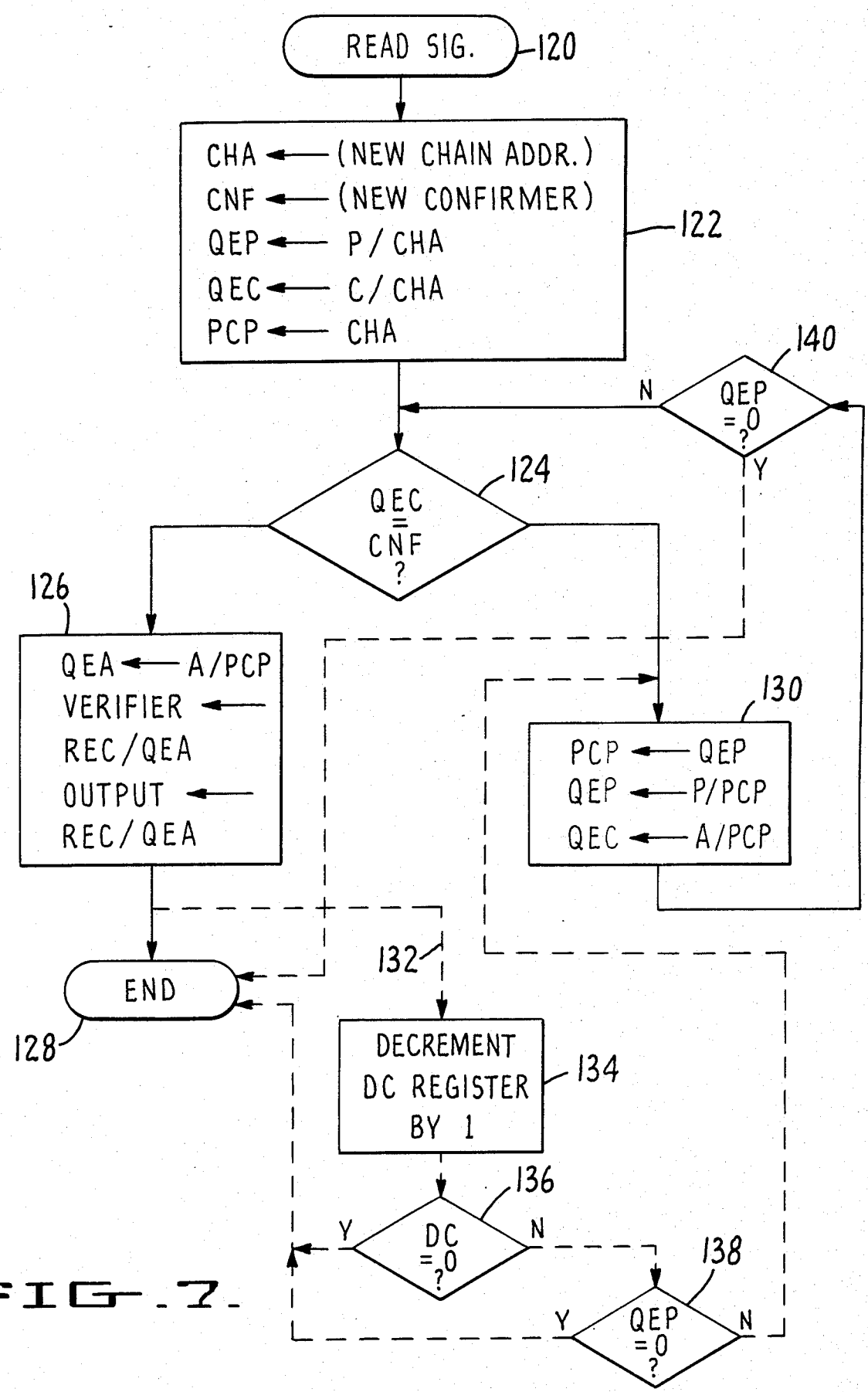
FIG. 7 is a flow chart of the record reading operation carried out in a data storage system embodying aspects of my invention.

A query signal set corresponding to the record to be read (if such a record is contained in store 24) is submitted to input section 12 by the host device via information flow path 56, and a read signal from the host device is transmitted to control device 69 via information flow path 54, as illustrated by step 120 of the flow chart of FIG. 7.

In response to these signals (FIG. 7, step 122) catalog 22, analyzer 14, transformer 16, dissector 18, and combiner 20, etc., all shown in FIG. 1, coact in the manner described above in the description of the record writing operation to produce in the CHA and CNF registers of control device 69, respectively, representations of the new chain address and the new confirmer, which correspond to the query submitted to input section 12.

Upon the completion of this chain address and confirmer generating and loading operation, control device 69 copies the content of the C section of the catalog entry location addressed by the content of the CHA register (C/CHA) (if any) into the QEC register, copies the content of the P section of the same catalog entry location (P/CHA) into the QEP register, and then copies the content of the CHA register into the PCP register, all as illustrated in FIG. 7, step 122.

The routine of FIG. 7 then proceeds to decision step 124, in which the contents of the CNF and QEC registers are tested for equality.

If these register contents are found to be equal, the routine of FIG. 7 branches to step 126, in which the content of the A part of the catalog entry location addressed by the content of the PCP register (A/PCP) is copied into the queried entry address (QEA) register, the record at the record location of store 24 addressed by the content of the QEA register (REC/QEA) is copied into the record latch of verifier 26, and the record at the record location addressed by the content of the QEA register is also copied into the record latch of output section 28, after which the routine of FIG. 7 ends at step 128.

If, on the other hand, the contents of the QEC and CNF registers are not equal after step 122, the decision step 124 causes the routine to branch to step 130, in which the content of the QEP register is copied into the PCP register, the P part of the catalog entry location addressed by the content of the PCP register (P/PCP) is copied into the QEP register, and the A part of the catalog entry location addressed by the content of the PCP register (A/PCP) is copied into the QEC register.

This routine then proceeds to decision step 124, in which the QEC and CNF register contents are again tested for equality, via decision step 140 described below.

The routine continues to circulate around the loop including steps 124, 130, and 140 until the contents of the QEC and CNF registers are found to be equal at step 124, at which time the routine branches to and executes step 126, and concludes at step 128, or the entry chain runs out as detected at step 140.

At step 128, however reached, the record corresponding to the query signal set submitted to input section 12 by the host device at the beginning of the reading operation is found in the record latches of verifier 26 and output section 28, whereafter the above-described verification operation takes place. If the verification operation results in a verification signal, rather than a non-verification signal, output section 28 emits a set of signals representing the just read record to the host device via information flow path 66. Control device 69 then carries out the necessary "housekeeping", i.e., clears certain registers, etc., in accordance with program instructions which will be provided by those having ordinary skill in the art without the exercise of invention or undue experimentation.

In accordance with a principal feature of my invention the reading operation of some embodiments thereof does not terminate when one record corresponding to a particular query has been read out from store 24, but rather the entry chain addressed by the new chain address derived from that query is further explored, and all records corresponding to that query, up to a limit preset by the host device in a duplicate counter (DC) register (FIG. 6), are read out seriatim.

In these embodiments the completion of step 126 (FIG. 7) is followed (via dashed flow path 132) by the execution of step 134 in which the content of the DC register preset by the host device is decremented by one bit.

The immediately following decision step 136 tests the DC register for zero content.

If the content of the DC register is zero, the routine proceeds to its conclusion at step 128.

If, on the other hand, the content of the DC register is not zero, and the end of the entry chain has not been reached (step 138), step 130 is repeated, and looped through step 124 until another C part of an entry equal to the content of the CNF register (if any) is found, whereafter the routine proceeds to step 126, etc. The routine then continues as represented in FIG. 7 until the end. Step 128 is reached because either the DC register content is zero and is found to be such at decision step 136, or the end of the entry chain is reached and this is detected at decision step 138 or at decision step 140.

Deleting

Figure 8:
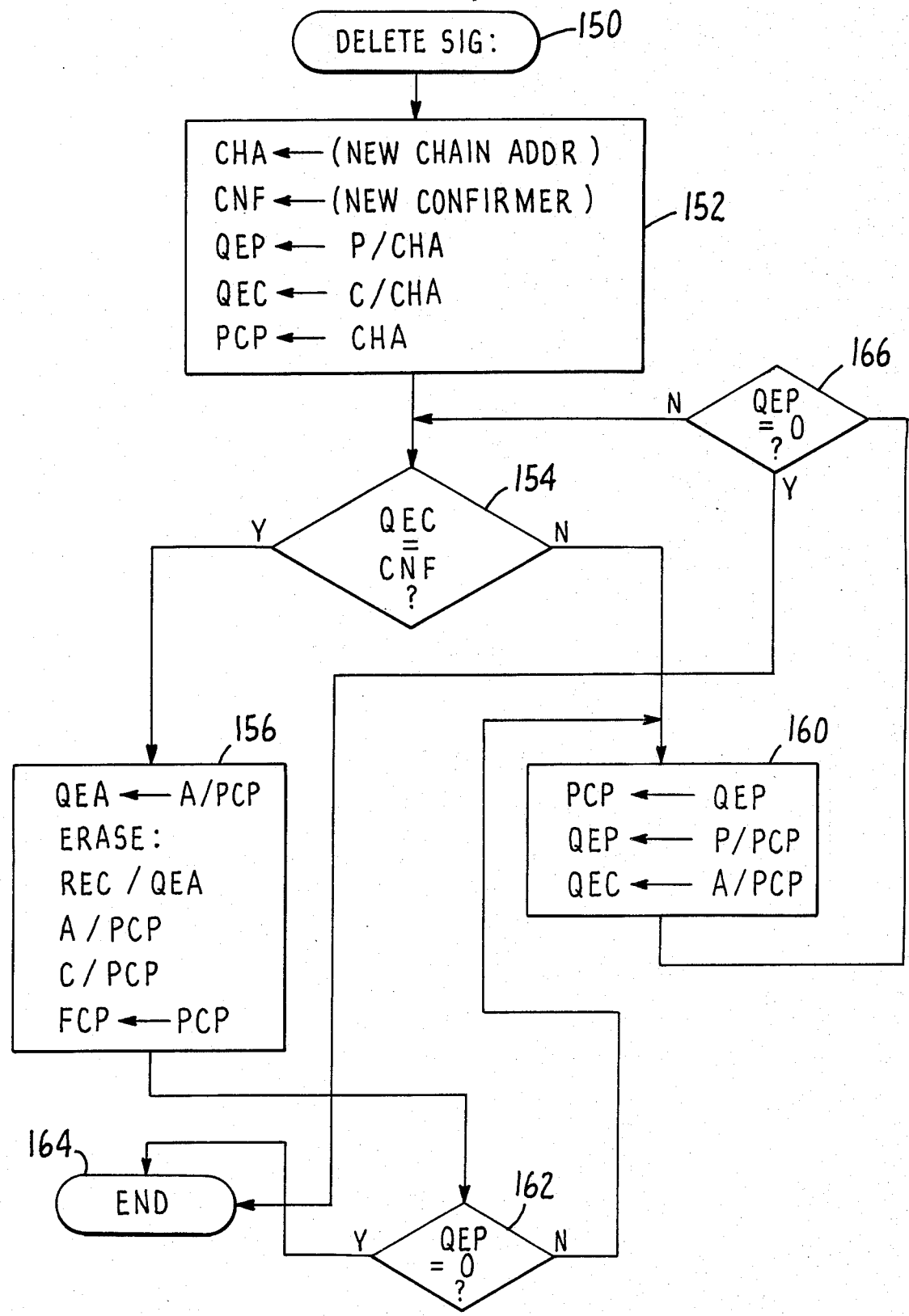
FIG. 8 is a flow chart of the record deleting operation carried out in a data storage system embodying aspects of my invention.

Referring now to FIG. 8, a mode of deleting a record from the store 24 of the device described hereinabove in connection with FIGS. 3 and 7, etc., will now be described.

Assuming that a large number of records have been written in store 24 by the host device in accordance with the method of writing described hereinabove, which is a principal feature of my invention, and that each such record in store 24 is cataloged by means of a corresponding entry in catalog 22 of the general type shown in FIG. 5, it will now be further assumed that the operation of the host device requires that one of those existing records be deleted from store 24, and that thus the host device has transmitted a delete signal to control device 69 via information flow path 54 (step 150, FIG. 8), and has submitted to input section 12 via information flow path 56 a set of signals representing the record to be deleted.

In response to these signals (FIG. 8, step 152) catalog 122, analyzer 14, transformer 16, dissector 18, combiner 20, etc., all shown in FIG. 1, coact in the manner described above in the description of the record writing operation to produce in the CHA and CNF registers of control device 69, respectively, representations of the new chain address and the new confirmer which corresponds to the record to be deleted as submitted to input section 12.

Upon the completion of this chain address and confirmer generating and loading operation, control device 69 copies the content of the C section of the catalog entry location addressed by the content of the CHA register (C/CHA) into the QEC register, copies the content of the P section of the same catalog entry location (P/CHA) into the QEP register, and then copies the content of the CHA register into the PCP register, all as illustrated in FIG. 8, step 152.

The routine of FIG. 8 then proceeds to decision step 154, in which the contents of the CNF and QEC registers are tested for equality.

If these register contents are found to be equal, the routine of FIG. 8 branches to step 156, in which the content of the A part of the catalog entry location addressed by the content of PCP register (A/PCP) is copied into the queried entry address (QEA) register, the record in store 24 addressed by the content of the QEA register is erased, the contents of the A and C parts of the catalog entry addressed by the content of the PCP register are erased, and the content of the PCP register is copied into the FCP memory, where it is enchained with addresses of other now available and previously occupied catalog locations (if any) in the manner well-known to those having ordinary skill in the computer programming art. (The available catalog entry locations in the FCP memory will, of course, be entered into the FCP register seriatim, in the well-known manner.)

If, on the other hand, the contents of the QEC and CNF registers are not equal after step 152, the decision step 154 causes the routine to branch to step 160, in which the content of the QEP register is copied into the PCP register, the content of P/PCP is copied into the QEP register, and the content of A/PCP is copied into the QEC register.

This routine then proceeds (via step 166, described below) to step 154, in which the QEC and CNF register contents are again tested for equality.

The routine continues to circulate around the loop including steps 154, 160, and 166 until the contents of the QEC and CNF registers are found to be equal at step 154, at which time the routine branches to and executes step 156, or the entry chain runs out, as detected at step 166.

In many embodiments of my invention the deleting operation does not terminate when one record in store 24 corresponding to the record to be deleted has been erased from store 24. Rather, after the completion of an erasing procedure in accordance with step 156 of the flow chart of FIG. 8 the routine of FIG. 8 branches to decision step 162. If then the content of the QEP resister is zero, i.e., the end of the entry chain has been reached, the routine of FIG. 8 proceeds to its end at step 164.

Otherwise, i.e., if the content of the QEP register is not equal to zero, the routine of FIG. 8 returns to step 160, and thence continues to circulate around the loop including steps 154, 160, and 166, until either another QEC-CNF match is found, i.e., another recording having the same key is found, which results in another erasing step 156, etc., or the end of the entry chain is detected at step 166, and thus the routine branches to its end at step 164.

Figures 9, 10:
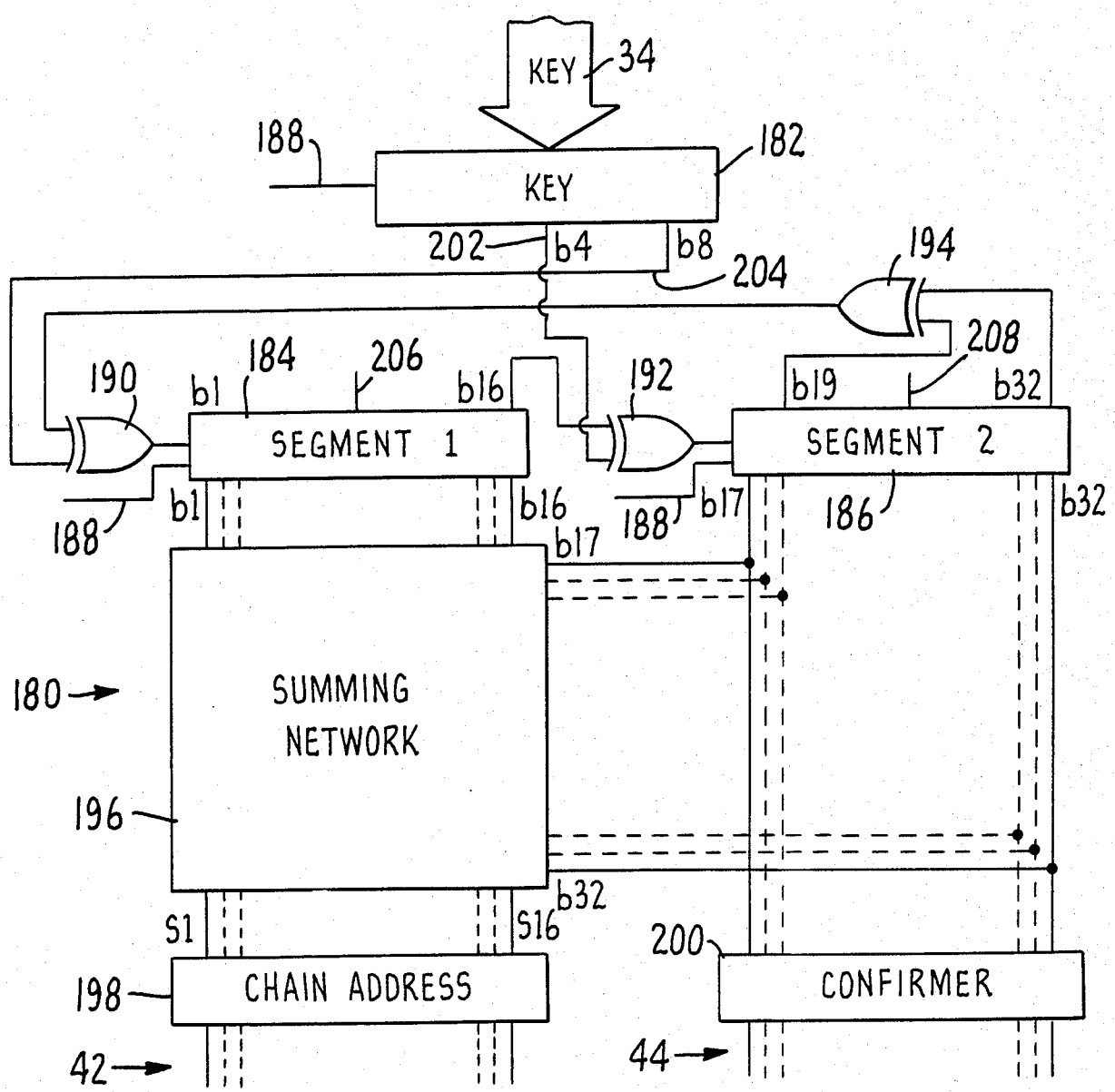
FIG. 9 is a schematic block diagram of a preferred entry index generator circuit embodying aspects of my invention.
FIG. 10 is a tabular representation of the operation of the summing network of the circuit of FIG. 9.

Referring now to FIG. 9 and 10, there is schematically shown a preferred form of entry index generator circuit of my invention. As explained hereinabove, an entry index generator circuit combines the functions of a transformer, a dissector, and a combiner; and produces in response to each key signal set submitted to it a chain address signal set and a confirmer signal set, which last two mentioned signal sets are together called an entry index signal set herein.

As seen in FIG. 9, entry index generator 180 comprises a shift register 182 called the key register and two shift registers 184, 186 called respectively the segment 1 register (184) and the segment 2 register (186). The shifting of the data contained in shift registers 182, 184, and 186 is brought about, one bit at a time, by shift signals occurring on information flow path 188.

Entry index generator 180 further comprises three EXCLUSIVE OR gates 190, 192, 194 which are interconnected with the key and segment registers in the manner shown in FIG. 9; a summing network 196; a chain address latch 198; and a confirmer latch 200. The structure and function of summing network 196 is described hereinbelow in connection with FIG. 10.

A preferred embodiment of my present invention, arbitrarily called herein the first preferred embodiment and comprising sections corresponding to those represented in FIG. 1 and described hereinabove, has the following structural characteristics: (a) the catalog memory is a high-speed integrated circuit random access memory of the type now well-known in the art; (b) the functions of the control device 69 of catalog 22, as described hereinabove, are carried out by a well-known general purpose digital computer or processor of the type which can be programmed to carry out those functions by one having ordinary skill in the computer programming art, informed by the present disclosure, without the exercise of invention; (c) the functions of input section 12, analyzer 14, verifier 26, and output section 28 are also carried out by that processor; (d) store 24 is a disk drive of well-known type; and (e) the functions of transformer 16, dissector 18, and combiner 20 are carried out by a dedicated circuit especially designed and adapted to carry out those functions and only those functions, which dedicated circuit is shown schematically in FIG. 9.

Referring again to FIG. 9, it is to be noted that key register 182 is an eight bit shift register comprising eight bit storage elements, b1 through b8, so constructed and arranged, in the well-known manner, that upon each occurrence of a shift signal on its shift signal input terminal connected to information flow path 188 the bit value or bit value representing state of each bit storage element passes to the next highest order bit storage element (e.g., the bit value representing state of b1 passes to b2, the bit value representing state of b2 passes to b3, etc.).

As shown in FIG. 9, a representation of each successive key is emitted in parallel (by analyzer 14) via information flow path or bus 34 into key register 182, the acceptance of these successive parallel-emitted key signal sets being controlled by suitable signals from control device 69.

Key register 192 is further provided with two bit storage element output connections 202, 204, on which are provided signals representing, respectively, the bit value representing states of the b4 and b8 bit storage elements.

It is to be particularly noted that in many applications of this first preferred embodiment of my invention the keys will be multi-byte keys; and that such multi-byte keys will be submitted or fed to key register 182, via information flow path 34, one byte at a time, i.e., in bit-parallel, byte serial form.

In such a case, the bytes of a given key will be fed to key register 182 seriatim, and each byte will be shifted four times by a chain of four signals on information flow path 188, during the generation of one entry index (chain address and confirmer), and the segment 1 and segment 2 registers will be cleared by signals provided by control device 69 on their clear input terminals 206 and 208 only after all of the bytes of a particular key have been submitted to key register 182, shifted four times and processed by EXCLUSIVE OR gates 190, 192, 194, segment registers 184, 186, and summing network 196, and the resulting chain address and confirmer stored in their respective latches 198, 200.

As also seen in FIG. 9, an EXCLUSIVE OR gate 190 provides successive input signals to the first or b1 bit storage element of segment 1 register 184, and an EXCLUSIVE OR gate 192 provides successive input signals to the first or b17 bit storage element of segment 2 register 186.

Each segment register 184, 186 is a sixteen bit shift register, which may be similar in structure to key register 182 but of twice the bit storage capacity, i.e., having sixteen bit storage elements, rather than eight. The shift input signal terminals of registers 184 and 186 are connected to information flow path 188. (In order to avoid ambiguity of operation, it may be found desirable in some embodiments of my invention to provide extremely short term delay elements of well-known type whereby these shift input signals are applied to the respective shift signal inputs of registers 182, 184, 186 seriatim, the extremely short delays provided thereby being sufficient for circuit 180 to "settle down" between the applications of successive register shift input signals.)

It is to be noted that, as with the entry index generator embodiment of FIG. 2, the segment 1 and segment 2 registers of FIG. 9 are, in a sense, considered to be a single register, i.e., the segment 1 register bit storage elements are designated as b1 through b16, whereas the segment 2 register bit storage elements are designated as b17 through b32.

As further seen in FIG. 9, a third EXCLUSIVE OR gate 194 receives its respective input signals from the b19 and b32 bit storage element output terminals of segment 2 shift register 186, and supplies one of the input signals to EXCLUSIVE OR gate 190. The other input signal to EXCLUSIVE OR gate 190 is the output signal of bit storage element b8 of key register 182.

EXCLUSIVE OR gate 192 receives one of its input signals from the output terminal of bit storage element b4 of key register 182, and the other one of its input signals from the output terminal of bit storage element b16 of segment 1 register 184.

Summing network 196 (FIG. 9) comprises two binary adders of well-known type, which are so interconnected as to carry out the function illustrated in FIG. 10. Such an interconnection of two binary adders will be provided by those having ordinary skill in the computer design art without the exercise of invention or undue experimentation.

Referring to FIG. 10, it will be seen that the first of these adders adds a sixteen bit binary number (augend) representing the current bit value representing states of the respective bit storage elements b1 through b16 of segment 1 register 184 to another sixteen bit binary number (addend) whose eight most significant bits represent the current bit value representing states of the respective bit storage elements b24 through b31 of segment 2 register 186, whose seven least significant bits represent the current bit value representing states of the respective bit storage elements b17 through b23 of segment 2 register 186, and whose other bit is at all times a zero bit. In this first summing operation the carry bit from the summing of the two most significant bits, b1 and b24, is discarded.

The sum signal set representing the sum of these two binary numbers (augend and addend) produced by the first adder is supplied to the second adder as its augend input signal set, and, as also shown in FIG. 10, the signal set representing the current bit value representing states of the respective bit storage elements b17 through b32 of segment 2 register 186 are supplied to the second adder as its addend input signal set. The sum output signal set of the second adder (discarding the most significant bit sum carry) is the output signal set of summing network 196, which is produced upon output terminal set S1 through S16 shown in FIG. 9.

As further seen in FIG. 9, the output of summing network 196, S1 through S16, which is the chain address corresponding to the key just previously submitted, one byte at a time, to key register 182, is stored in chain address latch 198; and the storage element output signal set b17 through b32 of segment 2 register 186, which is the confirmer corresponding to the key just previously submitted, one byte at a time, to key register 182, is stored in confirmer latch 200.

As will now be evident to those having ordinary skill in the art, informed by the present disclosure, the output signal lead set of chain address latch 198 (FIG. 9) corresponds, in this first preferred embodiment of my invention, to information flow path 42 of FIG. 1, and the output signal lead set of confirmer latch 200 (FIG. 9) corresponds, in this first preferred embodiment of my invention, to information flow path 44 of FIG. 1.

The program of a software version of my invention in which the processor is a well known Z-80 microprocessor is set out in the program listing attached to and constituting a part of this specification.

It will thus be seen that the objects set forth above, among those made apparent from the preceding description, are efficiently attained, and since certain changes may be made in the above constructions and the methods carried out thereby without departing from the scope of my present invention, it is intended that all matter contained in the above description or shown in the accompanying drawings shall be interpreted as illustrative only, and not in a limiting sense.

It is also to be understood that the following claims are intended to cover all of the generic and specific features of my present invention herein described, and all statements of the scope of my present invention which, as a matter of language, might be said to fall therebetween.

```
.TITLE   "SOFTWARE EMULATION VERSION"
.SBTTL   "COPYRIGHT (C) 1983, BRANDIN RESEARCH, INC."
;
; COPYRIGHT (C) 1983, BRANDIN RESEARCH, INC.
;
; AUTHOR: CHRISTOPHER L. BRANDIN
;
; VERSION: 11/11/83
;
.IDENT   CAM              ;MODULE ID
;
;
; CAM QUANTA BREAKDOWN:
; BYTE 1 = DATA RECORD POINTER LSB
; BYTE 2 = DATA RECORD POINTER MSB
```

```
.TITLE  "SOFTWARE EMULATION VERSION"
.SPTTL  "COPYRIGHT (C) 1983, BRANDIN RESEARCH, INC."
;
; BYTE 3 = CONFIRMATION LSB
; BYTE 4 = CONFIRMATION MSB
;
; BYTE 5 = CHAIN POINTER LSB
; BYTE 6 = CHAIN POINTER MSB
;
;
; KEY PACKET BREAKDOWN:
;
; BYTE 1 = LENGTH OF KEY
; BYTE 2...N = KEY
;
;
BASE    = 0C0H           ;CACHE CARD BASE ADDRESS
;
DPORT   = BASE           ;CACHE CARD ADDRESSES
BPORT   = BASE+1
TPORT   = BASE+2
SPORT   = BASE+3
;
        .LOC    .DATA.#  ;LOCATE IN DATA AREA
;
NUM::    .BYTE   0        ;TRY COUNT
FREE:    .WORD   0000H    ;FREE LIST POINTER
PCHAIN:  .BLKB   3        ;PREVIOUS CHAIN POINTER
RECNO:   .WORD   0000H    ;DATA RECORD NUMBER
NCHAIN:  .WORD   0000H    ;CHAIN POINTER REGISTER
COUNT:   .WORD   0000H    ;DUPLICATE RESOLUTION COUNT
;TRANS:  .BYTE   00H      ;TRANSFORM SHIFT IN BUFFER
;TRAN0:  .BYTE   00H      ;TRANSFORM INTERMEDIATE HOLDING AREA
;TRAN1:  .BYTE   00H
;TRAN2:  .BYTE   00H
;TRAN3:  .BYTE   00H
;
        .LOC    .PROG.#  ;LOCATE IN PROGRAM AREA
;
CAM::   ORA     A        ;FIND COMMAND?
        JZ      FNDCAM   ;  YES
        DCR     A        ;ADD COMMAND?
        JZ      ADDCAM   ;  YES
        DCR     A        ;DELETE COMMAND?
        JZ      DELCAM   ;  YES
        DCR     A        ;CLEAR WRITE PROTECT AND PARITY ERROR
        JZ      CLRCAM   ;  YES
        DCR     A        ;SET WRITE PROTECT?
        JZ      SWRCAM   ;  YES
        DCR     A        ;GET CACHE CARD STATUS?
        JZ      STACAM   ;  YES
        DCR     A        ;RELINK CAM FREE LIST?
        JZ      RELCAM   ;  YES
        DCR     A        ;INITIALIZE COMMAND?
        JZ      INTCAM   ;  YES
        MVI     A,0FFH   ;ELSE RETURN NOT IMPLEMENTED CODE
        RET
```

;
; CALL FIND WITH KEY PACKET ADDRESS D & E AND DUPLICATE COUNT NUMBER
; IN B & C.
;
; REGISTERS ABDEHL ARE DESTROYED
;
; IF THE RECORD IS FOUND A IS RETURNED WITH 00 IN IT AND THE DATA RECORD
; MSB IS IN H AND THE LSB IS IN L.

```
.TITLE   "SOFTWARE EMULATION VERSION"
.SBTTL   "COPYRIGHT (C) 1983, BRANDIN RESEARCH, INC."
; IF THE RECORD IS NOT FOUND A IS RETURNED WITH 02H IN IT.
;
FNDCAM:  SBCD    COUNT     ;SAVE DUPLICATE COUNT
         CALL    XFORM#    ;DO TRANSFORM
         MVI     C,DPORT   ;GET DATA PORT
..NXT:   CALL    GET       ;PROGRAM CACHE CARD
         LDA     NUM       ;UPDATE TRY COUNT
         INR     A
         STA     NUM
         INP     L         ;DATA POINTER=0?
         INP     H
         MOV     A,H
         ORA     L
         JRZ     ..NOK     ; YES
         INP     A         ;CONFIRMATION MATCH?
         CMP     E
         JRNZ    ..NOM     ; NO
         INP     A
         CMP     D
         JRNZ    ..NOMA    ; NO
         PUSH    H         ;SAVE H&L
         LHLD    COUNT     ;GET COUNT
         DCX     H         ;THIS DUPLICATE DESIRED?
         SHLD    COUNT
         MOV     A,H
         POP     H         ;RESTORE H&L
         ORA     L
         JRNZ    ..NOM     ; NO
         XRA     A         ;RETURN FOUND STATUS
         JMP     EXIT      ;DONE
..NOM:   INP     A         ;SKIP BYTE
..NOMA:  INP     A         ;GET CHAIN POINTER
         INP     L
         MVI     H,1       ;SET H FOR DUPLICATE AREA
         JMP     ..NXT     ;GET NEXT MEMBER
..NOK:   MVI     A,04H     ;RETURN NOT FOUND STATUS
         JMP     EXIT      ;DONE

;
; CALL ADD WITH DATA RECORD NUMBER IN H&L AND KEY PACKET ADDRESS IN D&E.
;
; REGISTERS ABCDEHL ARE DESTROYED
;
ADDCAM:  SHLD    RECNO     ;SAVE DATA RECORD POINTER
         CALL    XFORM#    ;DO TRANSFORM
         MVI     C,DPORT   ;GET DATA PORT
         CALL    GET       ;PROGRAM CACHE CARD
         SHLD    PCHAIN    ;SAVE CURRENT ADDRESS
         LDA     NUM       ;UPDATE TRY COUNT
         INR     A
         STA     NUM
         MOV     A,B       ;GET ADDRESS LSB
         STA     PCHAIN+2  ;SAVE IT
         INP     B         ;PRIMARY SLOT EMPTY?
         JRNZ    ..NOE     ; NO
         INP     B
         JRNZ    ..NOEA    ; NO
         CALL    GETA      ;REPROGRAM CACHE CARD
         LHLD    RECNO     ;GET RECORD NUMBER
         OUTP    L         ;PROGRAM DATA RECORD ADDRESS
         OUTP    H
         OUTP    E         ;SET CONFIRMATION
         OUTP    D
         XRA     A         ;RETURN NO ERROR
         JMP     EXIT      ;DONE
```

```
.TITLE   "SOFTWARE EMULATION VERSION"
.SPTTL   "COPYRIGHT (C) 1983, BRANDIN RESEARCH, INC."
..NOE:   IN      DPORT       ;SKIP SECOND BYTE
..NOEA:  IN      DPORT       ;SKIP CONFIRMATION
         IN      DPORT
         LDA     NUM         ;UPDATE TRY COUNT
         INR     A
         STA     NUM
         INP     L           ;GET CHAIN POINTER
         INP     H
         SHLD    NCHAIN      ;SAVE IT
         LHLD    PCHAIN      ;GET RECORD NUMBER
         LDA     PCHAIN+2
         CALL    GETA        ;REPROGRAM CACHE CARD
         LHLD    FREE        ;GET FREE CHAIN RECORD
         MOV     A,L         ;NO RECORDS LEFT?
         MOV     L,H
         CPI     0FFH
         JRNZ    ..NOF       ; NO
         CMP     L
         JRZ     ..FULL      ; YES
..NOF:   INP     H           ;ELSE REPROGRAM PRIMARY CHAIN POINTER
         INP     H           ;SKIP DATA RECORD ADDRESS
         INP     H           ;SKIP CONFIRMATION
         INP     H
         OUTP    A           ;PROGRAM NEW CHAIN POINTER
         OUTP    L
         MVI     H,1         ;SET FOR DUPLICATE AREA
         CALL    GET         ;PROGRAM CACHE CARD FOR NEW RECORD
         PUSH    H           ;SAVE CACHE ADDRESS
         INP     L           ;GET NEW FREE LIST POINTER
         INP     H
         SHLD    FREE        ;SAVE IT
         POP     H           ;RESTORE CACHE ADDRESS
         CALL    GETA        ;REPROGRAM CACHE CARD
         LHLD    RECNO       ;GET DATA RECORD NUMBER
         OUTP    L           ;PROGRAM DATA RECORD ADDRESS
         OUTP    H
         OUTP    E           ;PROGRAM CONFIRMATION
         OUTP    D
         LHLD    NCHAIN      ;GET CHAIN POINTER
         OUTP    L
         OUTP    H
         XRA     A           ;RETURN NO ERROR
         JMP     EXIT        ;EXIT
..FULL:  MVI     A,08H       ;SET FULL ERROR
         JMP     EXIT        ;EXIT

;
; CALL DELETE WITH KEY PACKET ADDRESS IN D&E AND THE DUPLICATE NUMBER
; IN B&C.
;
; REGISTERS ABCDEHL ARE DESTROYED
;
DELCAM:  MVI     A,0FFH      ;RETURN NOT IMPLEMENTED
         RET
;
CLRCAM:  IN      SPORT       ;CLEAR WRITE PROTECT AND PARITY ERROR
         XRA     A           ;CLEAR A
         JMP     EXIT        ;EXIT
;
SWRCAM:  IN      TPORT       ;SET WRITE PROTECT
         XRA     A           ;CLEAR A
         JMP     EXIT        ;EXIT
;
RELCAM:  MVI     A,0FFH      ;RETURN NOT IMPLEMENTED
         RET
```

```
.TITLE   "SOFTWARE EMULATION VERSION"
.SBTTL   "COPYRIGHT (C) 1983, BRANDIN RESEARCH, INC."
; INITIALIZING ROUTINE DESTROYS REGISTERS ABCDEHL.
;
INTCAM: MVI     C,DPORT     ;GET DATA PORT
        IN      SPORT       ;CLEAR FLAGS
        XRA     A           ;CLEAR A AND B
        MOV     B,A
        OUT     BPORT       ;RESET CACHE ADDRESS
        OUT     TPORT
        OUT     SPORT
        LXI     H,600H      ;LOAD PRIMARY AREA WITH NULLS
..NXT:  OUT     DPORT
        DJNZ    ..NXT
        DCX     H
        MOV     A,H
        ORA     L
        JRNZ    ..NXT
        LXI     H,5554H     ;LINK FREE AREA
        LXI     D,0000H
        SDED    FREE
        MVI     A,0FFH
..NXT2: INX     D           ;INCREMENT CHAIN POINTER
        OUTP    E           ;LOAD CHAIN POINTER
        OUTP    D
        OUTP    A           ;INITIALIZE REST OF QUANTA
        OUTP    A
        OUTP    A
        OUTP    A
        DCX     H           ;DO ALL BYTES
        MOV     A,H
        ORA     L
        JRNZ    ..NXT2
        MVI     B,8         ;MARK LAST BLOCKS
..MOR:  OUTP    A
        DJNZ    ..MOR
        XRA     A
        JMP     EXIT
;
EXIT:   MOV     B,A         ;MOVE ERROR STATUS INTO B
        IN      BPORT       ;READ BOARD STATUS
        ANI     03H
        ORA     B           ;AND IN ERROR STATUS
        RET                 ;DONE

;
; CALL GET WITH THE ADDRESS MSB IN H, MID PORTION IN L AND THE LSB IN A.
; IF H IS 0 THEN ADDRESS IS IN PRIMARY AREA, IF 1 THEN IN CHAIN AREA.
;
; REGISTERS A B H L WILL BE DESTROYED.
;
; CALL GETA WITH THE ADJUSTED ADDRESS (X6) LSB IN A, THE MID PORTION IN
; L AND THE MSB IN H (BIT 7 OF THE LSB SHOULD BE DUPLICATED AS BIT 3
; OF H).
;
; REGISTER A IS DESTROYED AND THE ADDRESS LSB IS COPIED INTO B.
;
GET:    PUSH    D
        RAL                 ;MULTIPLY ADDRESS BY 6 WITH LSB IN A, MID
        RALR    L           ; PORTION IN L AND MSB IN H
        RALR    H
        MOV     B,A
        MOV     E,L
        MOV     D,H
        RAL
        RALR    L
```

```
.TITLE  "SOFTWARE EMULATION VERSION"
.SBTTL  "COPYRIGHT (C) 1983, BRANDIN RESEARCH, INC."
        RALR    H
        ADD     B
        DADC    D
        POP     D           ;RESTORE D&E
        BIT     7,A         ;POSITION BIT FOR CACHE CARD
        JRZ     GETA
        SET     3,H
        MOV     B,A         ;PUT A COPY OF THE ADDRESS LSB IN B
GETA:   OUT     BPORT       ;PROGRAM CACHE CARD
        MOV     A,L
        OUT     TPORT
        MOV     A,H
        OUT     SPORT
        RET

;
.XSYM
.END
        TITLE   "CAM TRANSFORM GENERATOR"
        SUBTTL  "COPYRIGHT (C) 1983, BY BRANDIN RESEARCH, INC."

.Z80
        .LIST

NAME    ('XFORM')

CSEG

XFORM::
        ;
        ; CLEAR SHIFT 'REGISTER'
        XOR     A                   ; CLEAR A-REG
        LD      (TRANS),A           ; PRE-SET TRANSFORM
        LD      (TRANS+1),A         ; PRE-SET TRANSFORM
        LD      (TRANS+2),A         ; PRE-SET TRANSFORM
        LD      (TRANS+3),A         ; PRE-SET TRANSFORM
        ;
        LD      A,(DE)              ; GET KEY LENGTH
        LD      B,A                 ; SET KEY BYTE COUNT
        INC     DE                  ; POINT TO FIRST BYTE IN KEY

;
        ; GENERATE ON EACH KEY BYTE
..LP0:  PUSH    BC                  ; SAVE BYTE COUNTER
        LD      A,(DE)              ; GET BYTE
        LD      B,A                 ; SAVE CHARACTER
        AND     0FH                 ; GET LOW NIBBLE - A
        LD      (LNIB),A            ; SAVE
        LD      A,B
        RRCA                        ; PLACE IN LOWER NIBBLE
        RRCA
        RRCA                        ; PLACE IN LOWER NIBBLE
        RRCA
        LD      B,A                 ; SAVE
        AND     0FH                 ; GET LOW NIBBLE - B
        LD      (HNIB),A            ; SAVE

;
        LD      B,4                 ; DO FOR EACH BIT IN NIBBLE
..LP1:  PUSH    BC                  ; SAVE BIT COUNTER
        CALL    .CNV.               ; DO TRANSFORM
        POP     BC                  ; RESTORE BIT COUNTER
        DJNZ    ..LP1
        ;
```

```
TITLE   "CAM TRANSFORM GENERATOR"
SUBTTL  "COPYRIGHT (C) 1983, BY BRANDIN RESEARCH, INC."
        INC     DE              ; POINT TO NEXT KEY BYTE
        POP     BC              ; RESTORE BYTE COUNTER
        DJNZ    ..LP0           ; DO KEY LOOP

;
        ; SET UP REG'S FOR RETURN
        LD      A,(TRANS+0)     ; GET ADDRESS
        LD      H,A             ;
        LD      A,(TRANS+1)     ;
        LD      L,A             ;

LD      A,(TRANS+2)     ; GET CONFIRMATION
        LD      D,A             ;
        LD      A,(TRANS+3)     ;
        LD      E,A             ;
        ;
        ;
        PUSH    DE              ; SAVE ORIGINAL CONFIRMATION
        XOR     A               ; SHIFT CONFIRMATION
        RR      D
        RR      E
        ;
        LD      B,E             ; SWAP FOR ADD
        LD      C,D             ;
        ADD     HL,BC           ; ADD IN
        ;
        POP     DE              ; RESTORE ORIGINAL CONFIRMATION
        XOR     A               ; ADD IN
        ADD     HL,DE
        LD      BC,0
        ADC     HL,BC

;
        ; RETURN
.EXT:   RET

;
        ; CAM TRANSFORM ROUTINE
.CNV.:  PUSH    BC              ; SAVE REG.
        PUSH    DE              ;
        ;
        LD      A,(TRANS+3)     ; XOR IN BIT 32
        AND     01H             ; STRIP OTHER BITS
        LD      B,A             ; SAVE
        LD      A,(LNIB)        ; GET LOWER NIBBLE
        RRCA                    ; GET CARRY
        LD      (LNIB),A        ; SAVE NIBBLE
        RLA                     ; GET CARRY BIT
        AND     01H             ; STRIP OTHER BITS
        XOR     B               ; XOR THE 2 BITS
        ;
        LD      B,A             ; XOR IN BIT 19
        LD      A,(TRANS+2)     ;
        AND     20H             ;
        RLCA                    ;
        RLCA                    ;
        RLCA                    ;
        XOR     B               ;
        ;
        RRA                     ; SET CARRY
        ;
        LD      HL,TRANS+0      ; POINT TO TRANSFORMATION AREA
        RR      (HL)            ; SHIFT 1 BIT AT A TIME
        INC     HL              ; POINT TO NEXT BYTE
        RR      (HL)            ;
        ;
        RLA                     ; GET CARRY BIT
        AND     01H             ; STRIP OTHER BITS
```

```
        TITLE   "CAM TRANSFORM GENERATOR"
        SUBTTL  "COPYRIGHT (C) 1983, BY BRANDIN RESEARCH, INC."
                LD      B,A             ; SAVE
                LD      A,(HNIB)        ; GET HIGH NIBBLE
                RRCA                    ; GET CARRY
                LD      (HNIB),A        ; SAVE NIBBLE
                RLA                     ; GET CARRY BIT
                AND     01E             ; STRIP OTHER BITS
                XOR     B               ; XOR THE 2 BITS
                RRA                     ; SET CARRY
                ;
                INC     HL              ; POINT TO NEXT BYTE
                RR      (HL)            ;
                INC     HL              ; POINT TO NEXT BYTE
                RR      (HL)            ;
                ;
                ;
                POP     DE
                POP     BC
                RET

DSEG

LNIB:           DB      0
HNIB:           DB      0

TRANS:          DB      0               ; ADDRESS OF TRANSFORM
                DB      0               ;
                DB      0               ; CONFIRMATION OF TRANSFORM
                DB      0               ;

END
.TITLE  "CAM TRANSFORM GENERATOR TEST"
.SBTTL  "COPYRIGHT (C) 1983, BRANDIN RESEARCH, INC."
;
; COPYRIGHT (C) 1983, BRANDIN RESEARCH, INC.
;
; AUTHOR: CHRISTOPHER L. BRANDIN
;
; VERSION: 11/21/83
;
; THIS PROGRAM ALLOWS THE TEST OF THE CAM ROUTINE
;
.IDENT  CAMTST          ;MODULE ID
;
TEST    = 1             ;TEST MODE KEY
OPSYS   = 0005          ;OPERATING SYSTEM CALL
;
        .LOC    .DATA.# ;LOCATE IN DATA AREA
;
KEY:    .BYTE   255     ;KEY BUFFER
KEY1:   .BYTE   0
        .BLKB   255
;
COD:    .BYTE   2       ;CODE BUFFER
COD1:   .BYTE   0
COD2:   .BYTE   0
COD3:   .BYTE   0
;
MSG1:   .ASCIS  [^H0D] [^H0A] "ENTER KEY: "
MSG2:   .ASCIS  [^H0D] [^H0A] "KEY WAS FOUND, CODE IS ##."
MSG3:   .ASCIS  [^H0D] [^H0A] "ENTER NUMBER: "
MSG4:   .ASCIS  [^H0D] [^H0A] "KEY HAS BEEN ADDED."
MSG5:   .ASCIS  [^H0D] [^H0A] "PERFORMANCE INDEX: #."
;
```

```
.TITLE   "CAM TRANSFORM GENERATOR TEST"
.SBTTL   "COPYRIGHT (C) 1983, BRANDIN RESEARCH, INC."
         .LOC    .PROG.#    ;LOCATE IN PROGRAM AREA
;
CAM1:    JMPR    STRT       ;GOTO PROGRAM AREA
;
TSON::   .BYTE   1AH,00,00,00,00,00       ;SIGN ON MESSAGE
         .ASCII  "CAM TRANSFORM GENERATOR TEST  (C) 1983 BY BRANDIN RESEARCH"
         .BYTE   0DH,0AH,"$"
;
STRT:    MVI     C,9        ;PRINT SIGN ON MESSAGE
         LXI     D,TSON
         CALL    OPSYS
         MVI     A,0?       ;INITIALIZE CAM
         CALL    CAM#
MORK:    LXI     H,MSG1     ;ASK FOR KEY
         CALL    ..PMES
         MVI     C,12       ;GET INPUT BUFFER
         LXI     D,KEY
         CALL    OPSYS
         LXI     D,KEY1     ;PUT KEY PACKET IN D
         LXI     B,1        ;PUT 1 IN BC
         XRA     A          ;CALL FIND ROUTINE
         CALL    CAM#
         ORA     A          ;TEST FLAGS
         JRNZ    ..NOF      ;ADD KEY IF NOT FOUND
         MOV     A,L        ;SAVE CODE
         STA     MSG2+23
         MOV     A,H
         STA     MSG2+24
         MVI     C,9        ;PRINT BUFFER
         LXI     D,MSG2
         CALL    OPSYS
         JMPR    ..DON      ;CONTINUE
..NOF:   LXI     H,MSG3
         CALL    ..PMES
         MVI     C,12       ;GET INPUT BUFFER
         LXI     D,COD
         CALL    OPSYS
         LDA     COD2       ;GET CODE
         MOV     L,A
         LDA     COD3
         MOV     H,A
         LXI     D,KEY1     ;ADD KEY
         MVI     A,01
         CALL    CAM#
         MVI     C,9        ;PRINT BUFFER
         LXI     D,MSG4
         CALL    OPSYS
..DON:   LDA     NUM#       ;GET TRY COUNT
         ADI     30H        ;CONVERT TO NUMBER
         STA     MSG5+19
         MVI     C,9        ;PRINT BUFFER
         LXI     D,MSG5
         CALL    OPSYS
         JMPR    MORK
;
..PMES:  MOV     E,M        ;GET CHARACTER
         PUSH    H          ;SAVE ADDRESS
         MVI     C,2        ;PRINT CHARACTER
         CALL    OPSYS
         POP     H          ;RESTORE ADDRESS
         BIT     7,M        ;SIGN BIT SET?
         RNZ                ;   YES-RETURN
         INX     H          ;POINT TO NEXT BYTE
         JMPR    ..PMES     ;DO NEXT CHARACTER
         RET                ;DONE
;
.XSYM
.END
```

What I claim as new and desire to secure by Letters Patent is:

1. The method of storing a predetermined bit pattern representing a permutation of data elements, comprising the steps of:
storing said predetermined bit pattern in a storage memory at an available location having a predetermined address;
deriving a key bit pattern from said predetermined bit pattern;
transforming said key bit pattern into a first index bit pattern and a second index bit pattern; and
storing a bit pattern representing said predetermined address and said second index bit pattern in a catalog memory at a location determined in accordance with said first index bit pattern and said second index bit pattern.

2. The method of storing a predetermined bit pattern as claimed in claim 1 in which said first index bit pattern is modified in accordance with said second index bit pattern to provide a third index bit pattern and said bit pattern representing said predetermined address and said second index bit pattern are then stored in a catalog memory at a location determined in accordance with said second index bit pattern and said third index bit pattern.

3. The method of storing a predetermined bit pattern as claimed in claim 1 in which the transforming of said key bit pattern into said first and second index bit patterns comprises the steps of:
storing said key bit pattern in a key bit pattern shift register; and
shifting said key bit pattern from said key bit pattern shift register into a logic circuit which emits a corresponding bit stream into a first index bit pattern register and a second index bit pattern register;
the operation of said logic circuit being controlled at least in part by contents of at least one of said first index bit pattern register and said second index bit pattern register.

4. The method of storing a predetermined bit pattern as claimed in claim 2 in which the transforming of said key bit pattern into said first and second index bit patterns comprises the steps of:
storing said key bit pattern in a key bit pattern shift register; and
shifting said key bit pattern from said key bit pattern shift register into a logic circuit which emits a corresponding bit stream into a first index bit pattern register and a second index bit pattern register;
the operation of said logic circuit being controlled at least in part by contents of at least one of said first index bit pattern register and said second index bit pattern register.

5. The method of storing a predetermined bit pattern as claimed in claim 3 further comprising the step of passing a bit stream shifted from said first index bit pattern register through a second logic circuit which emits a corresponding bit stream into said second index bit pattern register, the operation of said second logic circuit being controlled at least in part by contents of at least one of said first index bit pattern register and said second index bit pattern register.

6. The method of storing a predetermined bit pattern as claimed in claim 2 further comprising the step of passing the bit stream shifted from said first index bit pattern register through a second logic circuit which emits a corresponding bit stream into said second index bit pattern register, the operation of said second logic circuit being controlled at least in part by contents of at least one of said first index bit pattern register and said second index bit pattern register.

7. The method of storing a predetermined bit pattern as claimed in claim 2 in which the production of said third index bit pattern comprises the steps of:
adding to said first index bit pattern predetermined, shifted portions of said second index bit pattern; and
adding thereto said second index bit pattern.

8. The method of storing a predetermined bit pattern as claimed in claim 4 in which the production of said third index bit pattern comprises the steps of:
adding to said first index bit pattern predetermined, shifted portions of said second index bit pattern; and
adding thereto said second index bit pattern.

9. The method of storing a predetermined bit pattern as claimed in claim 6 in which the production of said third index bit pattern comprises the steps of:
adding to said first index bit pattern predetermined, shifted portions of said second index bit pattern; and
adding thereto said second index bit pattern.

10. A digital data storage system comprising a storage memory containing a plurality of records each of which is located at a predetermined record address and a catalog memory containing a plurality of entries each of which corresponds to one of said records in said storage memory and comprises the address thereof, at least some of said entries further comprising a chain pointer address designating another one of said entries and a confirmation index derived from the corresponding record.

11. A digital data storage system as claimed in claim 10 further comprising entry index generating means for deriving from a record a chainhead entry address and a confirmation index.

12. A digital data storage system as claimed in claim 11 in which said entry index generating means comprises analyzer means for deriving keys from succesive ones of said reords, transformer means for transforming said keys into corresponding key transforms, dissecting means for dissecting said key transform's into segments, and combining means for combining predetermined ones of said key transform segments in accordance with a predetermined logical function, whereby to produce in response to each record received by said analyzer means a chainhead entry address and a confirmation index.

13. A digital data storage system as claimed in claim 12 in which said transformer means comprises a key shift register, a plurality of key transform segment shift registers, and at least one logic circuit constructed and arranged to modify one at a time of said keys in accordance with a predetermined logical function of at least part of the contents of at least one of said key transform segment shift registers as said one at a time of said keys is shifted bit-by-bit from said key shift register.

14. A digital data storage system as claimed in claim 13 in which said logical function is the EXCLUSIVE OR function.

15. A digital data storage system as claimed in claim 14 in which said combining means comprises adding means for adding together binary numbers representing the contents of said key transform segment shift registers and at least one modified version of the contents of one of said key transform segment shift registers.

* * * * *